United States Patent

[11] 3,574,891

| [72] | Inventors | Dean K. Bredeson;<br>Robert Kent Slaby, Piqua, Ohio |
|---|---|---|
| [21] | Appl. No. | 753,647 |
| [22] | Filed | Aug. 19, 1968 |
| [45] | Patented | Apr. 13, 1971 |
| [73] | Assignee | The French Oil Mill Machinery Company<br>Piqua, Ohio |

[54] MECHANICAL SCREW PRESS
3 Claims, 7 Drawing Figs.

| [52] | U.S. Cl. | 18/12 |
|---|---|---|
| [51] | Int. Cl. | B29f 3/02 |
| [50] | Field of Search | 18/12 (A), 12 (JH), 12 (SA), 12 (SB), 12 (SE), 12 (SF), 12 (SH), 12 (SI), 12 (SJ), 12 (SN), 12 (SR), 12 (ST), 12 (SU), 12 (SZ) |

[56] References Cited
UNITED STATES PATENTS

| 3,285,163 | 11/1966 | Burner | 18/12X |
| 3,362,044 | 1/1968 | Burner | 18/12 |
| 3,067,462 | 12/1962 | Kullgren | 18/12 |

FOREIGN PATENTS

| 848,596 | 9/1960 | Great Britain | 18/12A |

*Primary Examiner*—J. Spencer Overholser
*Assistant Examiner*—Michael O. Sutton
*Attorney*—Marechal, Biebel, French & Bugg ABSTRACT: A screw press has a drainage cage section connected to a smaller solid cage section which forms the discharge end. A screw having interrupted flights extends within the cage sections and has its feed end connected to a drive and its discharge end rotatably supported by the solid cage section. A die plate is mounted on the discharge end of the cage adjacent the discharge end of the screw, and a pivotable housing supports a motor-driven cutter for movement between an operable position adjacent the die plate and a retracted position which permits convenient access to the cutter and die plate.

Patented April 13, 1971  3,574,891
2 Sheets-Sheet 1
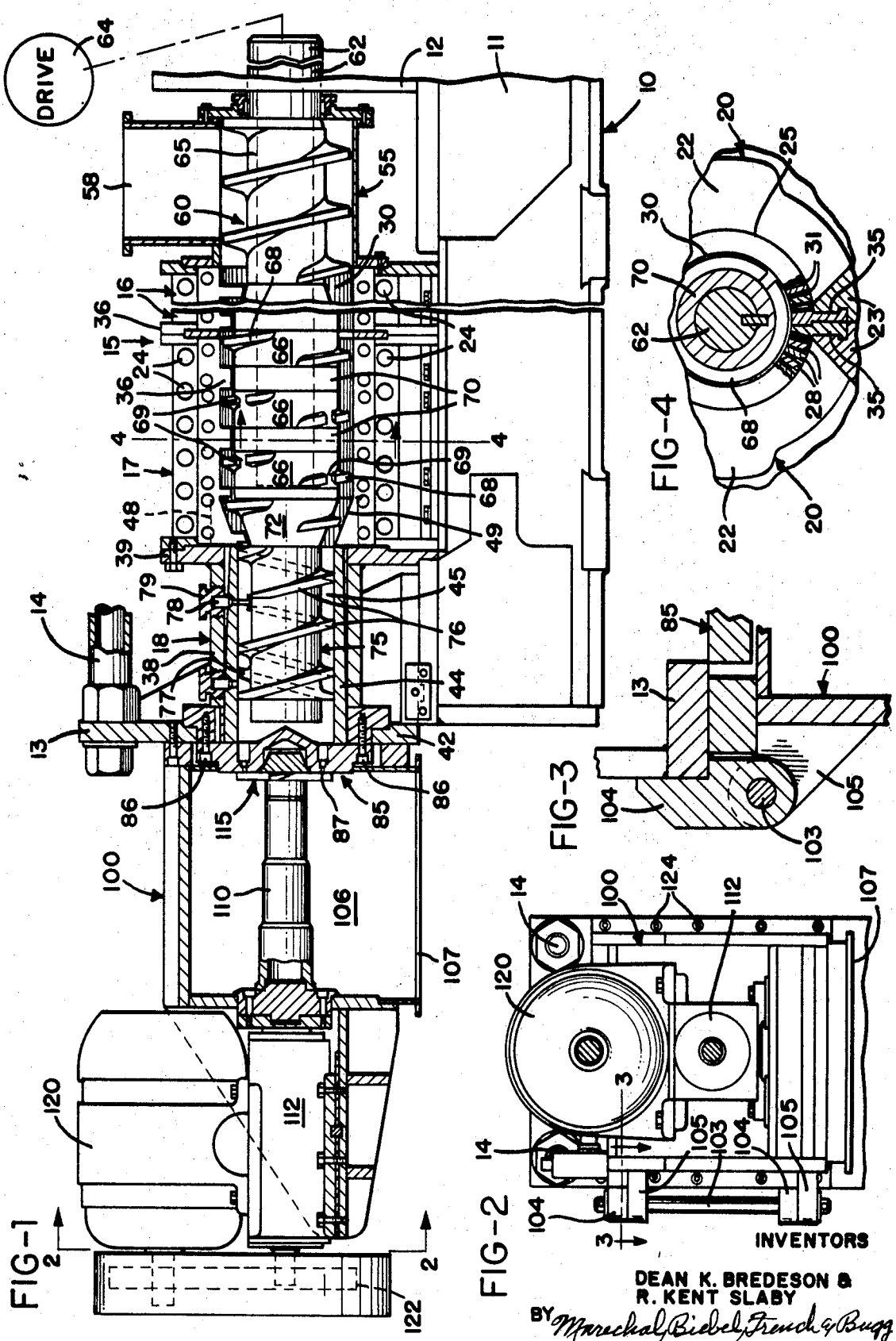
INVENTORS
DEAN K. BREDESON &
R. KENT SLABY
BY Marechal, Biebel, French & Bugg
ATTORNEYS

MECHANICAL SCREW PRESS

BACKGROUND OF THE INVENTION

In the processing of synthetic or natural rubber material, it has been found desirable to dry the material with the aid of a mechanical screw press such as shown in U.S. Pats. No. 3,276,354 and No. 3,285,163 which was issued to the assignee of the present invention. Furthermore, it has sometimes been found desirable to provide the discharge end of the screw press with a die plate such as disclosed in copending application Ser. No. 560,982, filed Jun. 27, 1966, now U.S. Pat. No. 3,382,583, so that the material is extruded from the press in a plurality of strings which are sheared into smaller pelletlike pieces by a knife or cutter rotated adjacent the die plate.

One common means for supporting the rotary cutter is to mount it on an extension of the main screw shaft so that it rotates with the shaft. The cutter may also be supported by antifriction means which are mounted on an extension of the screw shaft and be driven by a motor which is independent from the main drive for the screw shaft.

When the cutter is mounted on an extension of the screw shaft, usually some of the compacted material is extruded through the annular clearance space provided between the center opening of the annular die plate and the screw shaft thereby producing thin ribbons of material which are normally overheated by the high friction. Moreover, when the cutter is supported by an extension of the screw shaft, it is difficult to obtain quick and convenient access to the die plate for removal and interchangement with another die plate having apertures of a different size.

SUMMARY OF THE INVENTION

The present invention is directed to a mechanical screw press incorporating an improved cage and screw construction and an improved die plate and cutter arrangement which provides for minimizing the thrust on the die plate and for quick and convenient access to both the die plate and the rotary cutter. In accordance with a preferred embodiment of the invention, the screw press includes a cage having one or more drainage sections which are connected by a tapered sleeve to a smaller solid cylindrical cage section forming the discharge end of the cage.

A screw extending within the cage sections is driven from its feed end and includes a series of worms having interrupted flights within the drainage sections of the cage. The screw also includes a tapered worm which is disposed within the tapered sleeve and adjoins a discharge worm which is smaller in diameter than the worms within the drainage section. The discharge worm extends within the solid section of the cage and cooperates with this section to provide a bearing support for the discharge end of the screw.

A die plate having an annular array of apertures of predetermined size is connected to the discharge end of the cage adjacent the discharge end of the screw, and the tapered cage sleeve prevents the entire end thrust produced by the screw from being transferred to the die plate. A rotary cutter is positioned adjacent the die plate and is mounted on a shaft which is supported by a housing pivotally connected to the cage. The housing also supports a motor for driving the cutter shaft and enables the entire assembly of the cutter, shaft and motor to be moved or swung between an operative position where the cutter is precisely spaced relative to the die plate and a retracted position where both the die plate and the cutter are conveniently accessible for removal.

Other features and advantages of the invention will be apparent from the following description of the drawings and the appended claims.

BRIEF DESCRIPTION OF THE DRAWINGS

FIG. 1 is an elevational view of a screw press constructed in accordance with the invention with portions broken away and a portion shown in axial cross section;

FIG. 2 is a fragmentary elevational end view taken generally along the line 2–2 of FIG. 1;

FIG. 3 is a fragmentary section taken generally on the line 3–3 of FIG. 2;

FIG. 4 is a fragmentary section taken generally on the line 4–4 of FIG. 1;

DESCRIPTION OF THE PREFERRED EMBODIMENT

Figure 5:
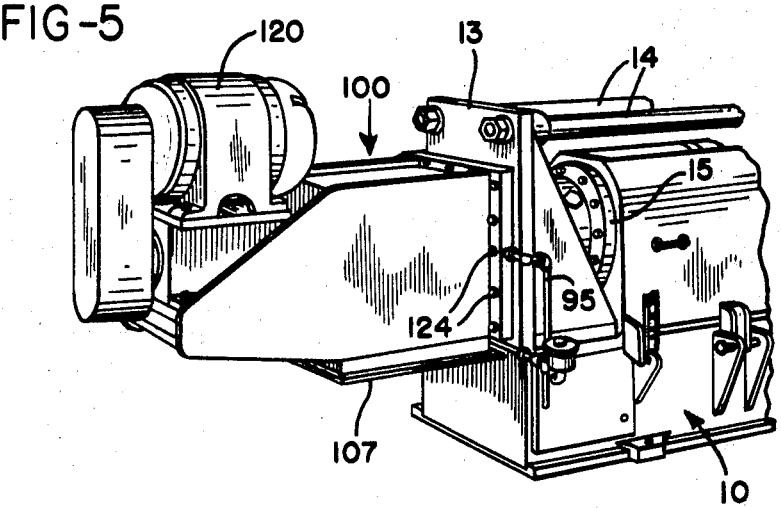
FIG. 5 is a perspective view of the discharge end portion of the press.

The screw press shown in FIG. 1 includes a frame 10 having an elongated base 11 which connects a gearbox housing 12 to an upwardly projecting end support 13. The upper end of the support 13 is also rigidly connected to the housing 12 by a pair of elongated tie bolts 14. An elongated barrel or cage 15 is supported by the frame 10 and includes a plurality of drainage sections 16, 17 and a discharge section 18.

The cage sections 16 and 17 are each formed by a pair of mating semicylindrical portions 20 (FIG. 4) each having a plurality of axially spaced arcuate ribs 22 connected by axially extended integral flange members 23. Each pair of mating cage portions 20 are rigidly connected by a plurality of tie bolts (not shown) which extend through a series of aligned holes 24 formed within the flange members 23. The ribs 22 of the mating cage portions 20 cooperate to define a cylindrical bore 25, and a plurality of axially extending screen bars 28 (FIG. 4) line the bore 25 to define a cylindrical pressing chamber 30. The bars 28 are peripherally spaced by wedge-shaped spacers (not shown) to form narrow axially extending drainage openings or slots 31 and are retained in each cage portion 20 by axially extending retaining bars 35 (FIG. 4) having axially spaced breaker members 36 projecting radially into the pressing chamber 30.

The cage section 18 includes a housing 38 having one end flange 39 secured to the end of the cage section 18 and an opposite annular end flange 42 which is secured to the upright frame support 13. A solid sleeve 44 is positioned within the housing 38 and defines a cylindrical chamber 45 which forms an extension of the pressing chamber 30. The chamber 45, however, does not have any drainage openings and is somewhat smaller in diameter than the pressing chamber 30. A smooth transition is made from chamber 30 to chamber 45 by an annular sleeve 48 having a frustoconical inner surface 49.

An inlet housing 55 is mounted on the inlet end of the cage 15 and has an inlet opening 58 which receives the rubber material to be pressed. An elongated screw 60 extends through the inlet housing 55 and the chambers 15 and 45 and includes a shaft 62 which is connected to a suitable drive motor 64 through a reduction gear train located within the gearbox housing 12.

The screw 60 includes a feed worm 65 which is mounted on the shaft 62 within the inlet housing 55 and a plurality of worms 66 which are mounted on the shaft 62 within the drainage sections 16 and 17 of the cage 15. Each of the worms 66 has a helical flight 68 preferably having notches 69, and the flights 68 are axially spaced by a plurality of cylindrical collars 70 mounted on the shaft 62 between the worms 66. The breaker members 36 project inwardly adjacent the collars 70 and between the worm flights 68 to resist rotation of the material with the worms 66.

A tapered worm 72 is mounted on the shaft 62 within the annular sleeve 48 and adjoins a worm 75 which extends within the chamber 45 and forms the discharge end portion of the screw 60. The worm 75 has a helical flight 76 which is interrupted to receive a breaker pin 78 supported by a fitting 79 threaded into the housing 38 and projecting into the chamber 45. The discharge end of the worm 75 also includes a second flight 77. Preferably, the outer peripheral surfaces of the flights 76 are hard coated and ground to form a close fit with the inner cylindrical surface of the sleeve 44 and thereby provide a bearing support for the discharge end portion of the screw 60.

Figure 6:
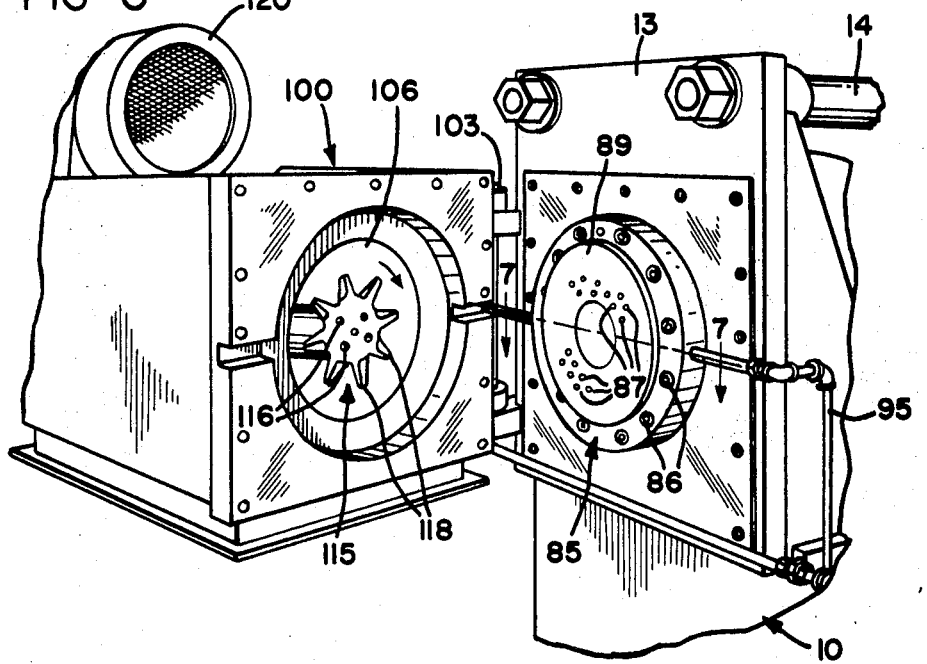
FIG. 6 is a fragmentary perspective view showing the cutter support housing pivoted to a retracted position.
Figure 7:
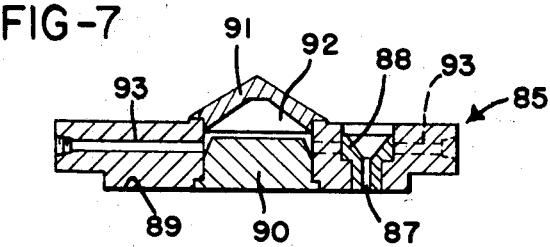
FIG. 7 is a section of the die plate taken generally along the line 7–7 of FIG. 6.

A circular die plate 85 (FIGS. 1, 6 and 7) is mounted on the annular flange 42 by a series of screws 86 and includes an annular array of nozzle orifices 87 each defined by a removable plug 88 (FIG. 7) which seats within a counterbore and extends axially to a flat annular face 89. Referring to FIG. 7, the die plate 85 includes a center plug 90 and a conical-shaped cap 91 which defines a central chamber 92. A pair of radially extending passageways 93 are formed within the die plate 85 and are connected to a pipe line 95 for directing steam into the die plate 85 for heating the die plate to a predetermined temperature. The plugs 88 are interchanged with another set of plugs for changing the size of the orifices 87, and the die plate 85 may be supported by a hinge to provide for swinging the die plate open after the screws 86 are removed and thereby provide for convenient interchangement of the plugs 88.

A housing 100 is pivotally connected to the end member 13 of the press frame 10 by a hinge 102 (FIG. 3) which includes a pivot pin 103 projecting through aligned holes formed within interfitting ears 104 and 105 secured to the frame member 13 and housing 100 respectively. Referring to FIG. 1, the housing 100 defines a generally square discharge chamber 106 having a bottom outlet 107. A shaft 110 is rotatably supported by a bearing assembly 112 mounted on the housing 100, and the forward end portion of the shaft extends through the chamber 106 to support a rotary cutter 115 which is secured to the end of the shaft 110 by a series of screws 116 (FIG. 6). The cutter 115 includes a plurality of peripherally spaced radially extending knives 118 which are positioned in close-spaced relation to the face 88 of the die plate 85 for rotation past the discharge orifices 87.

A motor 120 is mounted on the housing 100 and has an output shaft connected by a V-belt drive 122 to the rearward end portion of the shaft 110 for rotating the cutter 115. Referring to FIGS. 5 and 6, the housing 100 is secured to the upright end member 13 of the frame 10 by a series of screws 124. When it is desired to remove the die plate 85 and/or the cutter 115, however, the screws 124 are removed and the housing 100 is pivoted or swung to an open position as shown in FIG. 6 where the cutter is retracted from the die plate 85.

From the drawings and the above description, it becomes apparent that a screw press constructed in accordance with the invention provides several desirable features and advantages. For example, by reducing the diameter of the cage 15 and screw 60 with the tapered sleeve 48 and worm 72, the entire end thrust exerted by the screw on the compacted material within the pressing chamber 30 is not transferred to the die plate 85. That is, a portion of the end thrust is opposed by the sleeve 48. Moreover, the smaller worm 75 and sleeve 44 cooperate to provide a bearing support for the discharge end of the screw 60.

The support for the die plate 85 and the cutter 115, provides another important feature of the invention. That is, by mounting the die plate 85 on the discharge end of the cage 15 and by mounting the cutter 115 on the end of the motor-driven shaft 110 which is supported by the pivotal housing 100, the cutter 115 can be easily and quickly moved to a retracted position (FIG. 6) where both the die plate 85 and the cutter 115 are conveniently accessible for removal. This feature is especially desirable when it is desired to interchange die plate plugs 88 to increase or decrease the size of the discharge orifices 87 or to remove the cutter 115 for sharpening the blades 118. Furthermore, by driving the screw 60 from its feed end and by rotatably supporting the discharge worm 75 with the sleeve 44, it is unnecessary to extend the shaft 62 of the screw 60 through the die plate 85 with the result that there is no annular clearance gap through which the material can be extruded.

The pivotal connection between the housing 100 and the frame 10 provided by the hinge 102 also provides for maintaining a precise predetermined clearance between the die plate face 89 and the knives 118 of the cutter 115 after one die plate is interchanged with another die plate of the same thickness. Furthermore, the bearing assembly 112 and motor 120 may also be mounted on ways secured to the housing 100 and be axially adjustable by a lead screw so that the clearance between the knives 118 and die plate face 89 may be adjusted during operation to compensate for thermal expansion.

While the form of apparatus herein described constitutes a preferred embodiment of the invention, it is to be understood that the invention is not limited to this precise form of apparatus, and that changes may be made therein without departing from the scope of the invention which is defined in the appended claims.

We claim:

1. An improved screw press adapted for drying natural rubber material and the like, comprising an elongated cage including a plurality of circumferentially spaced screen bars arranged to define a cylindrical pressing chamber of uniform diameter, said screen bars defining circumferentially spaced slots extending axially along the length of said pressing chamber, a tubular discharge section secured to said cage and defining a cylindrical solid nondrainage discharge chamber in axial alignment with said pressing chamber and having a uniform diameter smaller than said uniform diameter of said pressing chamber, an annular sleeve supported by said cage and having a frustoconical inner surface tapering inwardly from said pressing chamber to said discharge chamber, said sleeve having an axial length substantially less than the axial length of said pressing chamber and effectively opposing the axial thrust on the material within said pressing chamber, a rotatable screw extending within said pressing and discharge chambers, said screw having a series of axially spaced helical flights within said pressing chamber, breaker bar means mounted on said cage and extending between said flights to resist rotation of the material with said screw, said screw including a tapered worm positioned within said annular sleeve and a discharge worm positioned within said discharge chamber, said discharge section forming a bearing support for said discharge worm to provide a rotary support for the discharge end portion of said screw, a die plate connected to said discharge section of said cage and positioned adjacent the end of said discharge worm, means defining a plurality of material discharge orifices within said die plate, a rotary cutter positioned adjacent said die plate, drive means for rotating said cutter, and drive means for rotating said screw to feed the material through said pressing chamber causing a free release of vapor from the material and then to feed the material through said discharge chamber to pressurize and heat the material for extrusion through said orifices within said die plate.

2. A screw press as defined in claim 1 wherein said discharge worm includes a plurality of axially spaced helical flights, breaker pin means extending through openings within said discharge section and projecting inwardly between said flights of said discharge worm, and threaded plug means removably secured to said discharge section for retaining said breaker pin means.

3. A screw press as defined in claim 1 wherein said discharge section comprises a sleeve having a tapered outer surface to facilitate removal of said sleeve when said die plate is removed.